United States Patent
Chattopadhyay et al.

(10) Patent No.: US 11,906,958 B2
(45) Date of Patent: Feb. 20, 2024

(54) SYSTEMS AND METHODS FOR DETERMINING OCCURRENCE OF PATTERN OF INTEREST IN TIME SERIES DATA

(71) Applicant: Tata Consultancy Services Limited, Mumbai (IN)

(72) Inventors: Tanushyam Chattopadhyay, Kolkata (IN); Abhisek Das, Kolkata (IN); Suvra Dutta, Kolkata (IN); Shubhrangshu Ghosh, Kolkata (IN); Prateep Misra, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 423 days.

(21) Appl. No.: 17/366,777

(22) Filed: Jul. 2, 2021

(65) Prior Publication Data
US 2022/0221847 A1 Jul. 14, 2022

(30) Foreign Application Priority Data
Jan. 13, 2021 (IN) .............................. 202121001728

(51) Int. Cl.
G05B 23/02 (2006.01)
G06F 18/20 (2023.01)
G06F 18/2415 (2023.01)

(52) U.S. Cl.
CPC ..... G05B 23/0227 (2013.01); G06F 18/2415 (2023.01); G06F 18/285 (2023.01)

(58) Field of Classification Search
CPC ............ G05B 23/0227; G05B 23/0221; G05B 23/0245; G06F 18/2415; G06F 18/285
See application file for complete search history.

(56) References Cited

U.S. PATENT DOCUMENTS

| 7,483,811 B2 * | 1/2009 | Whisnant | G05B 9/02 |
| | | | 702/179 |
| 8,719,190 B2 * | 5/2014 | El-Rafei | G06F 11/0715 |
| | | | 706/12 |

(Continued)

OTHER PUBLICATIONS

Unni, Vishnu R. et al., "Online detection of impending instability in a combustion system using tools from symbolic time series analysis", International journal of spray and combustion dynamics, Aug. 2015, pp. 243-256, vol. 7 • No. 3, https://journals.sagepub.com/doi/pdf/10.1260/1756-8277.7.3.243.

(Continued)

*Primary Examiner* — An H Do
(74) *Attorney, Agent, or Firm* — Finnegan, Henderson, Farabow, Garrett & Dunner, LLP

(57) ABSTRACT

State-of-the-art approaches have concentrated on building solution(s) to match the amplitude of a time series with a user given one. However, these have failed to implement solution(s) which enables searching for pattern(s) that can depict human vision psychology. Embodiments of the present disclosure determine occurrence of pattern of interest in time series data for anomaly detection, wherein time series data is obtained, and first order derivative is computed. Further an angle of change in direction is derived based on a gradient of change in value of the time series data. This angle is further converted to a measurement unit. The time series data is quantized into bins and a weighted finite state transducers diagram (WFSTD) is obtained based on domain knowledge which is then converted to specific pattern. The specific pattern is searched in the bins to determine occurrence/count of the specific pattern for anomaly detection.

18 Claims, 5 Drawing Sheets

(56) References Cited

U.S. PATENT DOCUMENTS

| | | | |
|---|---|---|---|
| 10,621,506 B2* | 4/2020 | Sarkar | G06N 7/01 |
| 11,131,606 B2* | 9/2021 | Ceschini | G05B 23/0221 |
| 2017/0124480 A1 | 5/2017 | Sarkar et al. | |
| 2018/0081855 A1* | 3/2018 | Cormier | G06N 3/043 |

OTHER PUBLICATIONS

Magoni, M. Damien et al., "Anomaly Detection and Root Cause Diagnosis in Cellular Networks", Oct. 2, 2019, IMT Atlantique, https://tel.archives-ouvertes.fr/tel-02304602/document.

* cited by examiner

SYSTEMS AND METHODS FOR DETERMINING OCCURRENCE OF PATTERN OF INTEREST IN TIME SERIES DATA

PRIORITY CLAIM

This U.S. patent application claims priority under 35 U.S.C. § 119 to: India Application No. 202121001728, filed on Jan. 13, 2021. The entire contents of the aforementioned application are incorporated herein by reference.

TECHNICAL FIELD

The disclosure herein generally relates to anomaly detection, and, more particularly, to systems and methods for determining occurrence of pattern of interest in time series data.

BACKGROUND

In manufacturing and aviation industries a very common problem is to detect whether any specific pattern has occurred frequently within a small amount of time in the time series or not. For example, to evaluate the fuel efficiency of an engine it is required to estimate how frequently the flight has encountered sudden fall and subsequent rise in altitude. Similarly, in manufacturing industry whether a machine part or a machine component has encountered sudden contraction and expansion within a short interval of time is required. Such observations/determinations are required for providing better services and manufacturing of products. Lack in timely determination results in shutdown of machines or abrupt failures in systems leading to infrastructure loss, increase in cost, and time.

The major limitation of the traditional approaches is that most of the state-of-the-art approaches concentrate to build the solution to match the amplitude of a time series with a user given one. Some other approaches attempted a Probabilistic Finite State Automaton (PFSA) based solution but construction of the transition probability is a difficult task for the real systems.

SUMMARY

Embodiments of the present disclosure present technological improvements as solutions to one or more of the above-mentioned technical problems recognized by the inventors in conventional systems. For example, in one aspect, there is provided a processor implemented method for determining occurrence of pattern of interest in time series data. The method comprises obtaining, via one or more hardware processors, an input time series data corresponding to one or more sensors attached to at least one computing device; computing, via the one or more hardware processors, a first order derivative over time using the obtained input time series data; computing, via the one or more hardware processors, a gradient of change in value of the obtained input time series data of the one or more sensors over time based on the first order derivative; deriving, via the one or more hardware processors, an angle of change in direction based on the gradient of change in value of the one or more sensors over time, and converting the derived angle to a measurement unit; quantizing, via the one or more hardware processors, the input time series data into a plurality of bins based on the measurement unit; obtaining, via the one or more hardware processors, a weighted finite state transducers diagram (WFSTD) based on a domain knowledge (obtained from user); converting, via the one or more hardware processors, the WFSTD into a specific pattern; determining, via the one or more hardware processors, a number of occurrences of the specific pattern in one or more bins of the plurality of bins within a specific time range; and detecting one or more anomalies based on the number of occurrences of the specific pattern within the specific time range.

In an embodiment, the specific pattern is indicative of a pattern of interest.

In an embodiment, the gradient of change in the value is computed based on one or more parameters of the one or more sensors associated with the computing device.

In an embodiment, the step of obtaining a weighted finite state transducers diagram (WFSTD) based on a domain knowledge comprises constructing the WFSTD using the domain knowledge and validating the constructed WFSTD.

In an embodiment, wherein the specific pattern comprises a string of alphanumeric characters.

In an embodiment, the step of detecting one or more anomalies based on the number of occurrences of the specific pattern within the specific time range comprises: performing a comparison of (i) the number of occurrence of the specific pattern with (ii) a pre-defined threshold; and detecting one or more anomalies based on the comparison.

In another aspect, there is provided a system for determining occurrence of pattern of interest in time series data. The system comprises a memory storing instructions; one or more communication interfaces; and one or more hardware processors coupled to the memory via the one or more communication interfaces, wherein the one or more hardware processors are configured by the instructions to: obtain an input time series data corresponding to one or more sensors attached to at least one computing device; compute a first order derivative over time using the obtained input time series data; compute a gradient of change in value of the obtained input time series data of the one or more sensors over time based on the first order derivative; derive an angle of change in direction based on the gradient of change in value of the one or more sensors over time, and converting the derived angle to a measurement unit; quantize the input time series data into a plurality of bins based on the measurement unit; obtain a weighted finite state transducers diagram (WFSTD) based on a domain knowledge (obtained from user); convert the WFSTD into a specific pattern; determine a number of occurrences of the specific pattern in one or more bins of the plurality of bins within a specific time range; and detect one or more anomalies based on the number of occurrences of the specific pattern within the specific time range.

In an embodiment, the specific pattern is indicative of a pattern of interest.

In an embodiment, the gradient of change in the value is computed based on one or more parameters of the one or more sensors associated with the computing device.

In an embodiment, the weighted finite state transducers diagram (WFSTD) obtained based on the domain knowledge comprises constructing the WFSTD using the domain knowledge and validating the constructed WFSTD.

In an embodiment, wherein the specific pattern comprises a string of alphanumeric characters.

In an embodiment, the one or more anomalies are detected based on the number of occurrences of the specific pattern within the specific time range by: performing a comparison of (i) the number of occurrence of the specific pattern with (ii) a pre-defined threshold; and detecting one or more anomalies based on the comparison.

In yet another aspect, there is provided a computer program product comprising a non-transitory computer readable medium having a computer readable program embodied therein, wherein the computer readable program, when executed on a computing device causes the computing device to determine occurrence of pattern of interest in time series data by obtaining, via one or more hardware processors, an input time series data corresponding to one or more sensors attached to at least one computing device; computing, via the one or more hardware processors, a first order derivative over time using the obtained input time series data; computing, via the one or more hardware processors, a gradient of change in value of the obtained input time series data of the one or more sensors over time based on the first order derivative; deriving, via the one or more hardware processors, an angle of change in direction based on the gradient of change in value of the one or more sensors over time, and converting the derived angle to a measurement unit; quantizing, via the one or more hardware processors, the input time series data into a plurality of bins based on the measurement unit; obtaining, via the one or more hardware processors, a weighted finite state transducers diagram (WFSTD) based on a domain knowledge (obtained from user); converting, via the one or more hardware processors, the WFSTD into a specific pattern; determining, via the one or more hardware processors, a number of occurrences of the specific pattern in one or more bins of the plurality of bins within a specific time range; and detecting one or more anomalies based on the number of occurrences of the specific pattern within the specific time range.

In an embodiment, the specific pattern is indicative of a pattern of interest.

In an embodiment, the gradient of change in the value is computed based on one or more parameters of the one or more sensors associated with the computing device.

In an embodiment, the step of obtaining a weighted finite state transducers diagram (WFSTD) based on a domain knowledge comprises constructing the WFSTD using the domain knowledge and validating the constructed WFSTD.

In an embodiment, wherein the specific pattern comprises a string of alphanumeric characters.

In an embodiment, the step of detecting one or more anomalies based on the number of occurrences of the specific pattern within the specific time range comprises: performing a comparison of (i) the number of occurrence of the specific pattern with (ii) a pre-defined threshold; and detecting one or more anomalies based on the comparison.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
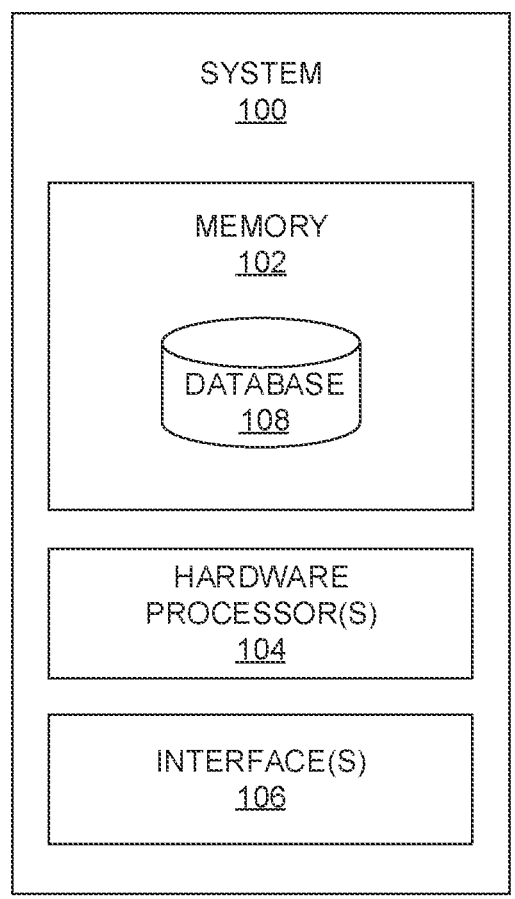
FIG. 1 depicts a system for determining occurrence of pattern of interest in time series data for detecting one or more anomalies, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 depicts a system 100 for determining occurrence of pattern of interest in time series data for detecting one or more anomalies, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises one or more set of time series data captured by one or more sensors attached to various equipment/(or devices) deployed and being operated in an industry or any other location. The database 108 further stores information on first order derivative over time being computed, gradient of change in value of the one or more sensors, derived angle of change in direction with associated measurement unit, a plurality of bins of the time series data, weighted finite state transducers diagram (WFSTD), specific patterns obtained from the WFSTD, occurrence of patterns in the time series data, and type of anomalies being detected.

The information stored in the database 108 further comprises various techniques such as quantizing technique(s) to quantize the time series data into bins, anomaly detection technique(s) as known in the art, classification technique(s) as known in the art and the like. The above-mentioned techniques comprised in the memory 102/database 108 are invoked as per the requirement by the system 100 to perform the methodologies described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
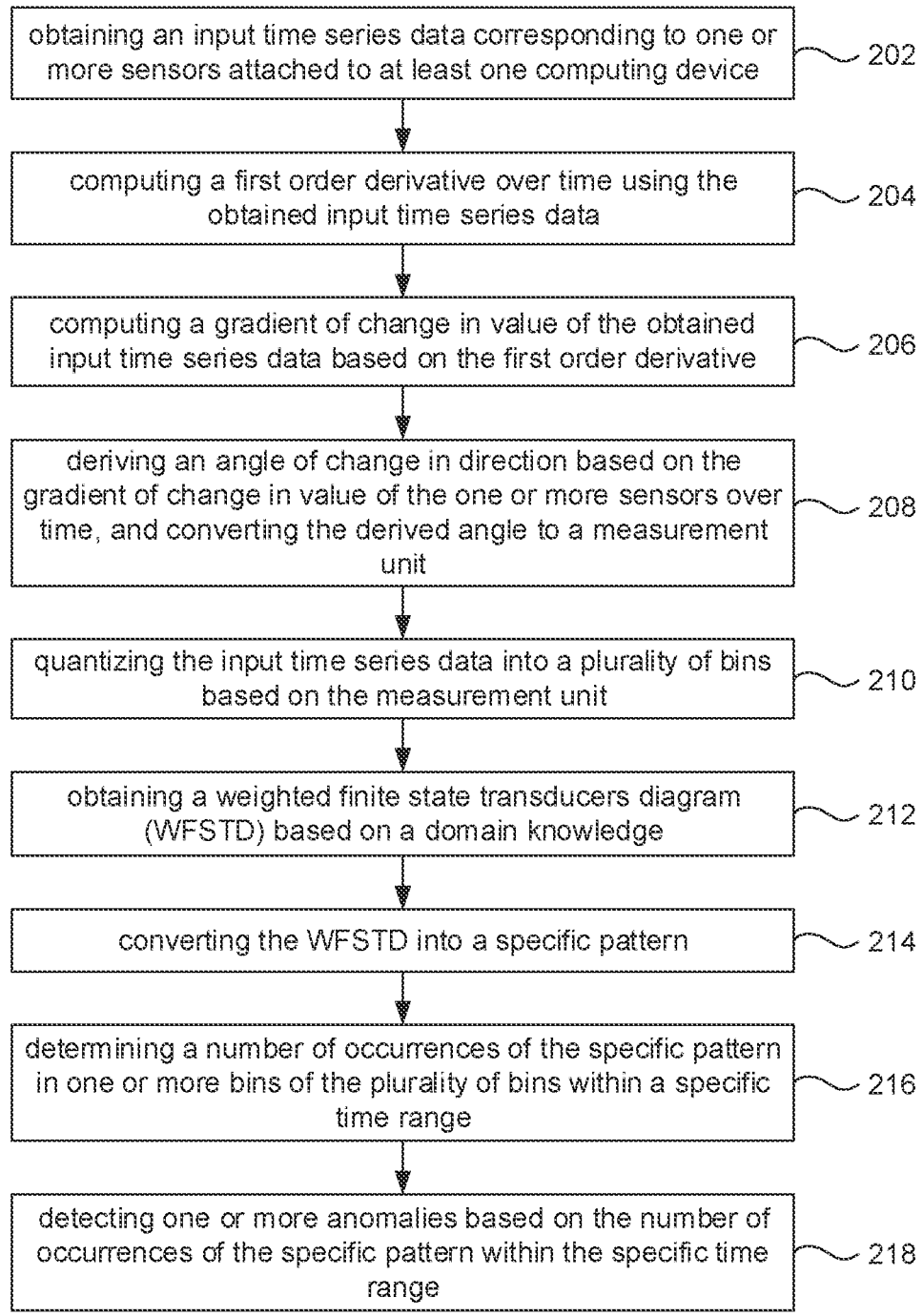
FIG. 2 depicts an exemplary flow chart illustrating a method for determining occurrence of pattern of interest in time series data for detecting one or more anomalies, using the system of FIG. 1, in accordance with an embodiment of the present disclosure.

FIG. 2, with reference to FIG. 1, depicts an exemplary flow chart illustrating a method for determining occurrence of pattern of interest in time series data for detecting one or more anomalies, using the system 100 of FIG. 1, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2. In an embodiment, at step 202 of the present disclosure, the one or more hardware processors 104 obtain an input time series data corresponding to one or more sensors attached to at least one computing device. In an embodiment, the at least one computing device is an Internet of Things (IoT) sensing device. Example of the IoT sensing device, includes but is not limited to, water pump(s), and the like. Below Table 1 illustrates example of the input time series data:

TABLE 1

| Start ID | End ID | Start Time | End Time | Sensor Start value | Sensor End value |
|---|---|---|---|---|---|
| 2 | 40 | 13:04.9 | 13:42.9 | 1741.5960234 | 1730.2072433 |
| 40 | 335 | 13:42.9 | 18:37.9 | 1730.2072433 | 1765.0700342 |
| 335 | 337 | 18:37.9 | 18:39.9 | 1765.0700342 | 1765.0693566 |
| 337 | 348 | 18:39.9 | 18:50.9 | 1765.0693566 | 1764.9817002 |
| 348 | 350 | 18:50.9 | 18:52.9 | 1764.9817002 | 1765.0366028 |
| 350 | 352 | 18:52.9 | 18:54.9 | 1765.0366028 | 1765.0361745 |
| 352 | 447 | 18:54.9 | 20:29.9 | 1765.0361745 | 1764.957438 |
| 447 | 448 | 20:29.9 | 20:30.9 | 1764.957438 | 1764.9760723 |

TABLE 1-continued

| Start ID | End ID | Start Time | End Time | Sensor Start value | Sensor End value |
|---|---|---|---|---|---|
| 448 | 449 | 20:30.9 | 20:31.9 | 1764.9760723 | 1765.0446897 |
| 449 | 452 | 20:31.9 | 20:34.9 | 1765.0446897 | 1765.0685743 |
| 452 | 456 | 20:34.9 | 20:38.9 | 1765.0685743 | 1764.9957275 |
| 456 | 458 | 20:38.9 | 20:40.9 | 1764.9957275 | 1764.9957275 |
| 458 | 461 | 20:40.9 | 20:43.9 | 1764.9957275 | 1765.0402024 |
| 461 | 462 | 20:43.9 | 20:44.9 | 1765.0402024 | 1765.039855 |
| ... | ... | ... | ... | ... | ... |
| 635 | 636 | 23:37.9 | 23:38.9 | 1769.7987706 | 1769.7872483 |
| 636 | 637 | 23:38.9 | 23:39.9 | 1769.7872483 | 1769.7027156 |
| 637 | 638 | 23:39.9 | 23:40.9 | 1769.7027156 | 1769.679835 |
| 638 | 649 | 23:40.9 | 23:51.9 | 1769.679835 | 1769.7095372 |
| 649 | 650 | 23:51.9 | 23:52.9 | 1769.7095372 | 1769.4039184 |

Referring to steps of FIG. 2, at step 204 of the present disclosure, the one or more hardware processors 104 compute a first order derivative over time using the obtained input time series data. The first order derivative is computed if the sensor records which stores the cumulative data as $\delta s$: $\delta s = S_n - S_{n-1}$ which indicates the consumption of the physical property sensed by that specific sensor. The difference of sensor observation at 13:03.9 and 13:04.9 is −0.325497. Hence the change is value is obtained by computing the difference in the sensor observation in two consecutive time stamps. Below Table 2 illustrates example of the first order derivative being computed over time using the obtained input time series data.

TABLE 2

| Timestamp | First ($1^{st}$) order Derivative |
|---|---|
| 0 | 13:04.9 | −0.325497 |
| 1 | 13:05.9 | −0.3254969 |
| 2 | 13:06.9 | −0.325497 |
| 3 | 13:07.9 | −0.325497 |
| 4 | 13:08.9 | −0.3254969 |
| 5 | 13:09.9 | −0.325497 |
| 6 | 13:10.9 | −0.325497 |
| 7 | 13:11.9 | −0.325497 |
| 8 | 13:12.9 | −0.3254969 |
| 9 | 13:13.9 | −0.325497 |
| 10 | 13:14.9 | −0.325497 |
| 11 | 13:15.9 | −0.325497 |
| 12 | 13:16.9 | −0.3254969 |
| 13 | 13:17.9 | −0.325497 |
| 14 | 13:18.9 | −0.325497 |
| 15 | 13:19.9 | −0.325497 |
| ... | ... | ... |
| 21 | 13:25.9 | −0.325497 |
| 22 | 13:26.9 | −0.325497 |
| 23 | 13:27.9 | −0.3254969 |
| 24 | 13:28.9 | −0.325497 |
| 25 | 13:29.9 | −0.325497 |

At step 206 of the present disclosure, the one or more hardware processors 104 compute a gradient of change in value of the input time series data associated with the one or more sensors over time based on the first order derivative. In an embodiment, the gradient of change in the value is computed based on one or more parameters of the one or more sensors associated with the computing device (e.g., the water pump). The one or more parameters comprise, but are not limited to, diameter, time, and the like. In the present disclosure, the gradient of change in the value is computed based on difference of diameter of the water pump and difference of time). In case of other IoT devices, such as an aerial vehicle (e.g., aircraft, drone, unmanned aerial, vehicles, and the like) the parameters of such vehicles include, altitude, GPS locations. Further example of devices includes land vehicles (e.g., a car). In such examples, parameters of the devices include, throttle position, torque, engine RPM. The gradient of change in the value is computed based on difference in throttle positions for each sensor and/or time instance.

According to the theory of coordinate geometry, the gradient of a line segment is defined as the change in y axis divided by the change in x axis. Normally the time is plotted in x axis and the sensor observations are plotted in y axis. Now when the input time series is re-sampled with an equal interval of time and the sampling rate is one unit, the change in the time axis, i.e., the x axis becomes one. Hence the first order difference in the observed sensor value becomes equal to the gradient when the time-series (sensor) data gets captured at every one unit of time. In the said case the sampling rate is one minute. It is to be understood by a person having ordinary skill or person skilled in the art such sampling rate shall not be construed as limiting the scope of the present disclosure.

At step 208 of the present disclosure, the one or more hardware processors 104 derive an angle of change in direction based on the gradient of change in value of the one or more sensors over time, and convert the derived angle to a measurement unit. The above step is better understood by way of following description. If the first order difference is x and the time series data is sampled at every one unit of time, then the gradient also becomes x. As discussed above, now the theta is obtained as: theta=arc tan (x). Below Table 3 illustrates example of conversion of the derived angle to a measurement unit (e.g., theta):

TABLE 3

|   | Timestamp | 1st order Diff | Measurement unit (theta) |
|---|---|---|---|
| 0 | 13:04.9 | −0.325497 | −18.02991372 |
| 1 | 13:05.9 | −0.3254969 | −18.02990854 |
| 2 | 13:06.9 | −0.325497 | −18.02991372 |
| 3 | 13:07.9 | −0.325497 | −18.02991372 |
| 4 | 13:08.9 | −0.3254969 | −18.02990854 |
| 5 | 13:09.9 | −0.325497 | −18.02991372 |
| 6 | 13:10.9 | −0.325497 | −18.02991372 |
| 7 | 13:11.9 | −0.325497 | −18.02991372 |
| 8 | 13:12.9 | −0.3254969 | −18.02990854 |
| 9 | 13:13.9 | −0.325497 | −18.02991372 |
| 10 | 13:14.9 | −0.325497 | −18.02991372 |
| 11 | 13:15.9 | −0.325497 | −18.02991372 |
| 12 | 13:16.9 | −0.3254969 | −18.02990854 |
| 13 | 13:17.9 | −0.325497 | −18.02991372 |
| 14 | 13:18.9 | −0.325497 | −18.02991372 |
| 15 | 13:19.9 | −0.325497 | −18.02991372 |
| ... | ... | ... | ... |
| 21 | 13:25.9 | −0.325497 | −18.02991372 |
| 22 | 13:26.9 | −0.325497 | −18.02991372 |
| 23 | 13:27.9 | −0.3254969 | −18.02990854 |
| 24 | 13:28.9 | −0.325497 | −18.02991372 |
| 25 | 13:29.9 | −0.325497 | −18.02991372 |

At step 210 of the present disclosure, the one or more hardware processors 104 quantize the input time series data into a plurality of bins based on the measurement unit. Below Table 4 illustrates example of the plurality of bins obtained by quantizing the input time series data based on the measurement unit (theta).

TABLE 4

| Start ID | End ID | Start Time | End Time | Sensor Start value | Sensor End value | Code/bin |
|---|---|---|---|---|---|---|
| 2 | 40 | 13:04.9 | 13:42.9 | 1741.5960234 | 1730.2072433 | d |
| 40 | 335 | 13:42.9 | 18:37.9 | 1730.2072433 | 1765.0700342 | b |
| 335 | 337 | 18:37.9 | 08:39.9 | 1765.0700342 | 1765.0693566 | a |
| 337 | 348 | 18:39.9 | 18:50.9 | 1765.0693566 | 1764.9817002 | c |
| 348 | 350 | 18:50.9 | 18:52.9 | 1764.9817002 | 1765.0366028 | d |
| 350 | 352 | 18:52.9 | 18:54.9 | 1765.0366028 | 1765.0361745 | b |
| 352 | 447 | 18:54.9 | 20:29.9 | 1765.0361745 | 1764.957438 | c |
| 447 | 448 | 20:29.9 | 20:30.9 | 1764.957438 | 1764.9760723 | d |
| 448 | 449 | 20:30.9 | 20:31.9 | 1764.9760723 | 1765.0446897 | c |
| 449 | 452 | 20:31.9 | 20:34.9 | 1765.0446897 | 1765.0685743 | b |
| 452 | 456 | 20:34.9 | 20:38.9 | 1765.0685743 | 1764.9957275 | c |
| 456 | 458 | 20:38.9 | 20:40.9 | 1764.9957275 | 1764.9957275 | d |
| 458 | 461 | 20:40.9 | 20:43.9 | 1764.9957275 | 1765.0402024 | c |
| 461 | 462 | 20:43.9 | 20:44.9 | 1765.0402024 | 1765.039855 | b |
| ... | ... | ... | ... | ... | ... | ... |
| 635 | 636 | 23:37.9 | 23:38.9 | 1769.7987706 | 1769.7872483 | c |
| 636 | 637 | 23:38.9 | 23:39.9 | 1769.7872483 | 1769.7027156 | d |
| 637 | 638 | 23:39.9 | 23:40.9 | 1769.7027156 | 1769.679835 | c |
| 638 | 649 | 23:40.9 | 23:51.9 | 1769.679835 | 1769.7095372 | d |
| 649 | 650 | 23:51.9 | 23:52.9 | 1769.7095372 | 1769.4039184 | b |

At step 212 of the present disclosure, the one or more hardware processors 104 obtain a weighted finite state transducers (WFST) diagram (WFSTD) based on a domain knowledge. The WFSTD is obtained from one or more users (e.g., subject matter experts, or domain experts), in one embodiment of the present disclosure. In another embodiment, the WFSTD is constructed using the domain knowledge and the constructed WFSTD is validated using one or more inputs from the subject matter experts/domain experts. The domain knowledge in this context comprises data (or input data) that is associated with a specific domain, a specific application, a specific use case (e.g., water pump (with sensors) serving as an IoT device, in the example described herein), time series, or set of time series. Though the present disclosure describes few examples such as being discussed herein (e.g., healthcare, manufacturing, and the like), such examples shall not be construed as limiting the scope of the present disclosure. Present disclosure discusses few of the advantages for implementation of the WFSTD:

1. The semi-ring abstraction allows the definition of automata representations and algorithms over a broad class of weight sets and algebraic operations: So, this can be used to solve a broad class of problems residing in multiple domains, such as, health care, manufacturing, and the like. For example, classification problems such as detecting of cardiac disease from ECG signal.
2. WFSTD allows language models and recognition alternatives to be manipulated algebraically; this made the system flexible to make the system adaptable. For instance, in the present disclosure, by utilizing WFSTD, the system 100 has been able to recognition pattern or perform pattern search in the time-series data for determining occurrences of such pattern, thereby detecting anomalies.
3. WFSTDs can be concatenated, unioned, intersected, composed, minimized, reversed, complemented, and transformed in a variety of other ways: So the system can be implemented for taking union with a new WFSTD (or any new rule, or new knowledge) if there is a change in the system operation.
4. WFSTDs have been successfully used in speech recognition, information extraction, statistical machine translation, OCR post-processing, and the like.

Figure 3:
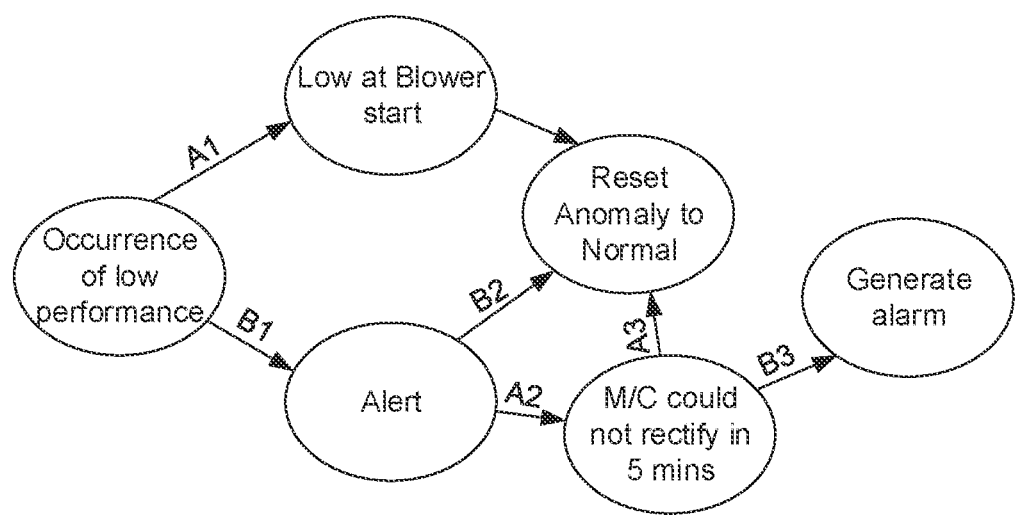
FIG. 3 depicts a weighted finite state transducers diagram (WFSTD) being converted into a specific pattern, in accordance with an embodiment of the present disclosure.

At step 214 of the present disclosure, the one or more hardware processors 104 convert the WFSTD into a specific pattern. FIG. 3, with reference to FIGS. 1-2, depicts the WFSTD being converted into a specific pattern, in accordance with an embodiment of the present disclosure. The specific pattern comprises a string of alphanumeric characters as shown in FIG. 3.

In the said example, all the sample are annotated with an alpha numeric code. Now, say as an administrator or an operator, one is interested to find whether a BAB pattern occurs in the time series or not. Now at any instance of time, it is of interest if the next state transition code is B. On reading B, an alert is raised by the system 100 but on reading A, the alert/alarm is reset by the system 100. The next code CA' is searched. If the next code is B, then it is reset again. The physical interpretation behind each state transition is also mentioned in the FIG. 3.

At step 214 of the present disclosure, the one or more hardware processors 104 determine a number of occurrences of the specific pattern in one or more bins of the plurality of bins within a specific time range. Below Table 5 illustrates example of the number of occurrences of the specific pattern being determined in one or more bins of the plurality of bins within a specific time range.

TABLE 5

| Start ID | End ID | N-gram |
|---|---|---|
| 40 | 335 | db |
| 335 | 337 | ba |
| 337 | 348 | ac |
| 348 | 350 | cd |
| 350 | 352 | db |
| 352 | 447 | bc |
| 447 | 448 | cd |
| 448 | 449 | dc |
| 449 | 452 | cb |
| 452 | 456 | bc |
| 456 | 458 | cd |
| 458 | 461 | dc |
| 461 | 462 | cb |
| 462 | 628 | bc |
| ... | ... | ... |
| 636 | 637 | cd |
| 637 | 638 | dc |
| 638 | 649 | cd |
| 649 | 650 | db |
| 650 | 781 | bd |

Figure 4:
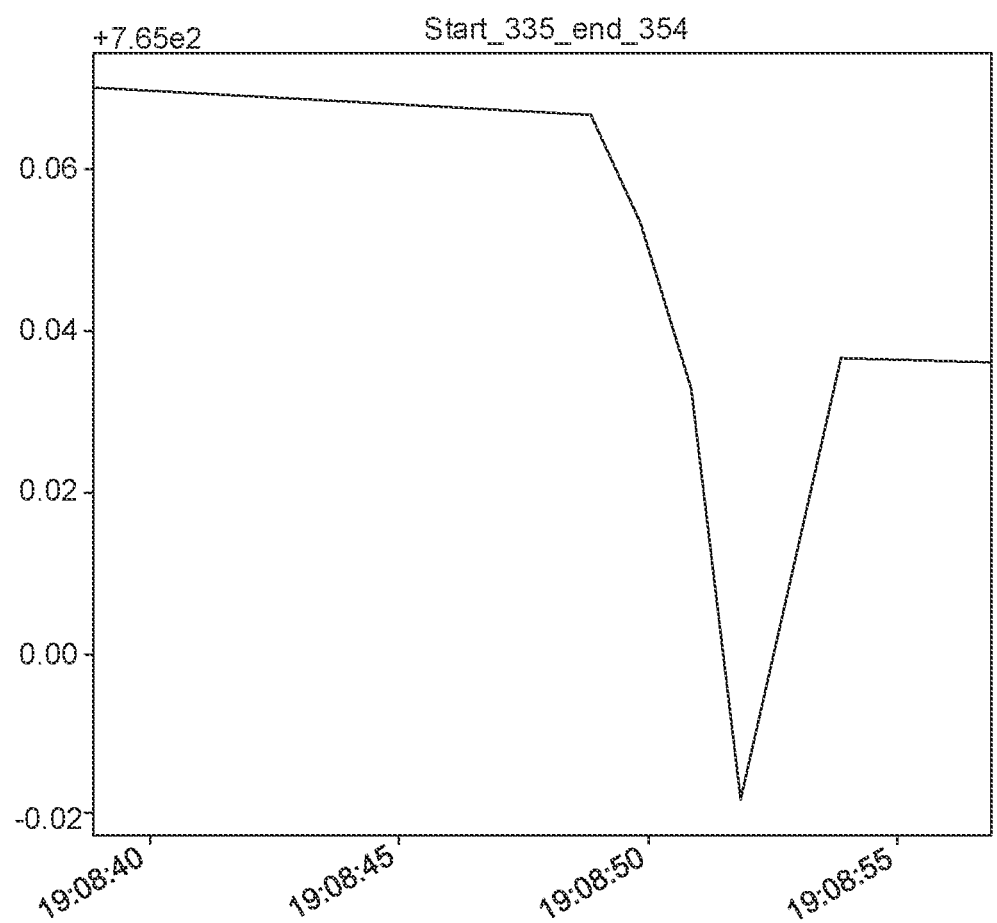
FIG. 4 depicts a graphical representation illustrating the specific pattern, in accordance with an embodiment of the present disclosure.

FIG. 4, with reference to FIGS. 1 through 3, depicts a graphical representation illustrating the specific pattern, in accordance with an embodiment of the present disclosure. More specifically, the specific pattern is of a V-shape as depicted in FIG. 4.

Figure 5:
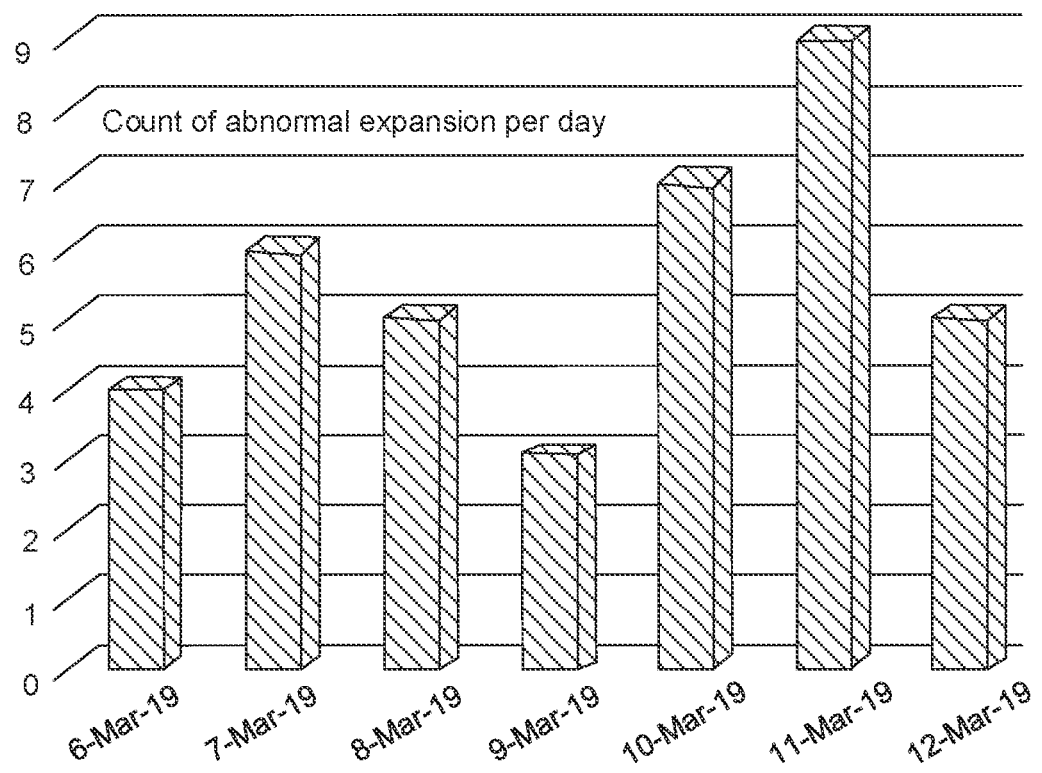
FIG. 5 depicts a graphical representation illustrating anomaly detected using the system of FIG. 1, in accordance with an embodiment of the present disclosure.

At step 214 of the present disclosure, the one or more hardware processors 104 detect one or more anomalies based on the number of occurrences of the specific pattern within the specific time range. In an embodiment of the present disclosure, a comparison of (i) the number of occurrences of the specific pattern with (ii) a pre-defined threshold is performed and based on the comparison the one or more anomalies are detected. The specific pattern is indicative of a pattern of interest (e.g., anomaly), in one embodiment. For instance, as depicted in FIG. 5, assuming the pre-defined threshold is 7. More specifically, FIG. 5, with reference to FIGS. 1 through 4, depicts a graphical representation illustrating anomaly detected using the system 100 of FIG. 1, in accordance with an embodiment of the present disclosure. As can be seen in FIG. 5, for the date 11 Mar. 2019, it is observed that the number of occurrences of the specific pattern is greater than the pre-defined threshold. More specifically, count of abnormal expansion per day is between 8 and 9 which is greater than 7. Hence, one or more anomalies are detected for 11 Mar. 2019.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   obtaining, via one or more hardware processors, an input time series data corresponding to one or more sensors attached to at least one computing device;
   computing, via the one or more hardware processors, a first order derivative over time using the obtained input time series data;
   computing, via the one or more hardware processors, a gradient of change in value of the obtained input time series data of the one or more sensors over time based on the first order derivative;
   deriving, via the one or more hardware processors, an angle of change in direction based on the gradient of change in value of the one or more sensors over time, and converting the derived angle to a measurement unit;
   quantizing, via the one or more hardware processors, the input time series data into a plurality of bins based on the measurement unit;
   obtaining a weighted finite state transducers diagram (WFSTD) based on a domain knowledge;
   converting, via the one or more hardware processors, the WFSTD into a specific pattern;
   determining, via the one or more hardware processors, a number of occurrences of the specific pattern in one or more bins of the plurality of bins within a specific time range; and
   detecting, via the one or more hardware processors, one or more anomalies based on the number of occurrences of the specific pattern within the specific time range.

2. The processor implemented method of claim 1, wherein the specific pattern is indicative of a pattern of interest.

3. The processor implemented method of claim 1, wherein the gradient of change in the value is computed based on one or more parameters of the one or more sensors associated with the computing device.

4. The processor implemented method of claim 1, wherein the step of obtaining a weighted finite state transducers diagram (WFSTD) based on a domain knowledge comprises constructing the WFSTD using the domain knowledge and validating the constructed WFSTD.

5. The processor implemented method of claim 1, wherein the specific pattern comprises a string of alphanumeric characters.

6. The processor implemented method of claim 1, wherein the step of detecting one or more anomalies based on the number of occurrences of the specific pattern within the specific time range comprises:
   performing a comparison of (i) the number of occurrences of the specific pattern with (ii) a pre-defined threshold; and
   detecting one or more anomalies based on the comparison.

7. A system, comprising:
   a memory storing instructions;
   one or more communication interfaces; and
   one or more hardware processors coupled to the memory via the one or more communication interfaces, wherein the one or more hardware processors are configured by the instructions to:
   obtain an input time series data corresponding to one or more sensors attached to at least one computing device;
   compute a first order derivative over time using the obtained input time series data;
   compute a gradient of change in value of the obtained input time series data of the one or more sensors over time based on the first order derivative;
   derive an angle of change in direction based on the gradient of change in value of the one or more sensors over time, and converting the derived angle to a measurement unit;
   quantize the input time series data into a plurality of bins based on the measurement unit;
   obtain a weighted finite state transducers diagram (WFSTD) based on a domain knowledge;
   convert the WFSTD into a specific pattern;
   determine a number of occurrences of the specific pattern in one or more bins of the plurality of bins within a specific time range; and
   detect one or more anomalies based on the number of occurrences of the specific pattern within the specific time range.

8. The system of claim 7, wherein the specific pattern is indicative of a pattern of interest.

9. The system of claim 7, wherein the gradient of change in the value is computed based on one or more parameters of the one or more sensors associated with the computing device.

10. The system of claim 7, wherein the step of obtaining a weighted finite state transducers diagram (WFSTD) based on a domain knowledge comprises constructing the WFSTD using the domain knowledge and validating the constructed WFSTD.

11. The system of claim 7, wherein the specific pattern comprises a string of alphanumeric characters.

12. The system of claim 7, wherein the one or more anomalies are detected based on the number of occurrences of the specific pattern within the specific time range by:
   performing a comparison of (i) the number of occurrences of the specific pattern with (ii) a pre-defined threshold; and
   detecting one or more anomalies based on the comparison.

13. A computer program product comprising a non-transitory computer readable medium having a computer readable program embodied therein, wherein the computer readable program, when executed on a computing device causes the computing device to determine occurrence of pattern of interest in time series data by:

obtaining, via one or more hardware processors, an input time series data corresponding to one or more sensors attached to at least one computing device;

computing, via the one or more hardware processors, a first order derivative over time using the obtained input time series data;

computing, via the one or more hardware processors, a gradient of change in value of the obtained input time series data of the one or more sensors over time based on the first order derivative;

deriving, via the one or more hardware processors, an angle of change in direction based on the gradient of change in value of the one or more sensors over time, and converting the derived angle to a measurement unit;

quantizing, via the one or more hardware processors, the input time series data into a plurality of bins based on the measurement unit;

obtaining, via the one or more hardware processors, a weighted finite state transducers diagram (WFSTD) based on a domain knowledge (obtained from user);

converting, via the one or more hardware processors, the WFSTD into a specific pattern;

determining, via the one or more hardware processors, a number of occurrences of the specific pattern in one or more bins of the plurality of bins within a specific time range; and detecting one or more anomalies based on the number of occurrences of the specific pattern within the specific time range.

14. The computer program product comprising a non-transitory computer readable medium of claim 13, wherein the specific pattern is indicative of a pattern of interest.

15. The computer program product comprising a non-transitory computer readable medium of claim 13, wherein the gradient of change in the value is computed based on one or more parameters of the one or more sensors associated with the computing device.

16. The computer program product comprising a non-transitory computer readable medium of claim 13, wherein the step of obtaining a weighted finite state transducers diagram (WFSTD) based on a domain knowledge comprises constructing the WFSTD using the domain knowledge and validating the constructed WFSTD.

17. The computer program product comprising a non-transitory computer readable medium of claim 13, wherein the specific pattern comprises a string of alphanumeric characters.

18. The computer program product comprising a non-transitory computer readable medium of claim 13, wherein the step of detecting one or more anomalies based on the number of occurrences of the specific pattern within the specific time range comprises:

performing a comparison of (i) the number of occurrences of the specific pattern with (ii) a pre-defined threshold; and detecting one or more anomalies based on the comparison.

* * * * *